United States Patent [19]

Balázs et al.

[11] 4,450,608
[45] May 29, 1984

[54] APPARATUS FOR PRODUCING TEMPERED PLATE PARTS

[75] Inventors: János Balázs; Tibor Báno; Árpád Kollár; Tibor Kovács; Dénes Lengyel; Ferenc Mózer, all of Budapest, Hungary

[73] Assignee: Richter Gedeon Vegyészeti Gyár RT, Budapest, Hungary

[21] Appl. No.: 389,539

[22] Filed: Jun. 18, 1982

[51] Int. Cl.³ ............................................. B23P 13/00
[52] U.S. Cl. .................................. 29/33 R; 29/33 Q; 76/112; 148/131; 148/156
[58] Field of Search ...... 29/33 Q, 33 R, 78, DIG. 42; 83/15, 16, 170, 171; 148/131, 153, 156; 76/112

[56] References Cited

U.S. PATENT DOCUMENTS

| | | | |
|---|---|---|---|
| 1,732,244 | 10/1929 | Salzman | 148/131 |
| 1,747,145 | 2/1930 | Schumacher | 148/131 |
| 1,811,236 | 6/1931 | Knapp | 29/33 Q X |
| 2,746,139 | 5/1956 | Pappelendam | 29/33 Q |
| 3,467,367 | 9/1969 | Bearer | 148/153 X |
| 3,534,947 | 10/1970 | Lenz | 148/153 X |
| 3,546,911 | 12/1970 | Lenz | 148/131 X |
| 4,057,230 | 11/1977 | Hays et al. | 148/131 X |
| 4,383,871 | 5/1983 | Harding et al. | 148/131 X |

*Primary Examiner*—William R. Briggs
*Assistant Examiner*—Glenn Webb
*Attorney, Agent, or Firm*—Gabriel Katona

[57] ABSTRACT

An apparatus for producing tempered plate spare parts, planar shaped products, shear platus, blades cut from band material, and particularly ampule files, comprises a band hobbing and feeding unit, in certain cases a mechanical forming unit, particularly a serrating and/or sharpening unit, a heating and cooling unit and a cutting mechanism. The apparatus is equipped with a cutting-cooling mechanism arranged on a cross slide that can alternately be displaced crosswise to the transfer trace of the band material and it is provided with pairs of cutting tools arranged in two parallel or approximately parallel—expediently flat—clamp plates that can be pressed to one another.

6 Claims, 2 Drawing Figures

APPARATUS FOR PRODUCING TEMPERED PLATE PARTS

BACKGROUND OF THE INVENTION

The invention relates to an apparatus for producing tempered plate spare parts, planar shaped products, shear plates, blades cut from band material, and particularly ampule files, which is made up of a hobbing and feeding unit, a mechanical forming unit in some cases, particularly a toothing and/or sharpening unit, a heating and cooling unit and a cutting mechanism.

In the most different branches of industry a demand for mass production of high productivity of tempered, particularly hardened products of a flat shape character, particularly of shear plates, blades, other components often arises, where their production is accomplished—starting from an expediently wound-up band material—by forming processing and by cutting. A typical example of such products is the ampule file, of which considerable amount, in some cases that of several tens of millions per year is required, and is used up, respectively, even by a single company, and against which very strict technical requirements in respect to straightness, size tolerance, corrosion resistance are set by the users, particularly due to its applicability in the generally used packaging and packing machines of the pharmaceutical industry.

The known apparatus producing ampule files generally employ band steel as starting material, they provide at least one of its edges with serration, then the product is cut to pieces of determined length and is tempered. One of the most important requirements representing a basic technical problem against the tempered finished product is that the files always must be flat plates without camber. Deformed, warped pieces may cause heavy operating troubles particularly in packaging. The camber of the ampule files is generally caused by inner mechanical tensions due to heat treatment.

Related ampule file producing apparatus is known, in which the deformations caused by heat treatment are sought to be eliminated by accomplishing the tempering operation in the uncut, band state of the material, keeping the band under a continuous stretch. Such an apparatus is e.g. the mechanism according to the Hungarian Patent Specification No. WI-291. Inclination of the finished products to warpage can actually be reduced this way. The main disadvantage of the solution, however, lies in that cutting has to be carried out in a hard, tempered state of the material, resulting in—as it can easily be understood—such requirements against the cutting mechanism in respect mainly of operational safety, stability, edge durability, etc., which can be met hard. The prescription of the suggested solution that only a partial heat treatment affecting the file edge range of the band material is to be carried out is inconsistent with the basic idea aimed at reducing inclination to warpage, because the very inner tensions increasing said inclination to warpage arise this way.

SUMMARY OF THE INVENTION

The invention is aimed at providing a technology and an apparatus suitable for accomplishing it, which facilitate productive mass production of products enumerated herein before, particularly of ampule files, simultaneously satisfying all quality requirements and guarantee with great certainty that the finished products are retentive, accordingly, particularly free of warpage, and deformation, respectively.

The invention is based on the perception that the aim set can be achieved by employing a sequence of technology operations, according to which after the band material has been heated up, cutting is made in the warm state of the material, before the cooling, then during the cooling the cut-up products are kept—expediently in the cutting tool itself—in a clamped state between clamp plates nearly until they are perfectly cooled down, accordingly the eventual inner tensions are not allowed to be released in deformation.

The essence of the invention lies in an apparatus—as disclosed above—which is made up of a band hobbing and feeding unit, in some cases a mechanical forming unit, particularly a toothing and/or sharpening unit, a heating and cooling unit and a cutting mechanism, where its essence lies in that it comprises a cutting-cooling mechanism arranged on a cross slide that can alternately be displaced crosswise relative to the trace of the band material transfer, where said cutting-cooling mechanism is provided with pairs of tools arranged between two parallel or approximately parallel, cooled—expediently flat—clamp plates that can be clamped to one another.

Employing water-cooled clamp plates in the cutting-cooling mechanism proved to be advantageous. Preferred embodiments of the apparatus according to the invention comprise a heating unit directly heated by a resistor, which is provided with current feeding elements and which clamps the band material in the ranges before and behind the cutting-cooling mechanism, as well as a feeding mechanism keeping the band under certain prestretch even during the heating. Forming and employing a toothing unit provided with at least one toothed roll clamped to the band material sideways and/or a sharpening unit comprising two abrasive discs being clamped to the band material from beneath and from the top each and their plane of rotation being at least approximately parallel with the plane of the band material proved to be also advantageous in the apparata according to the invention. Due to the productivity increasing and other advantageous effects, expedient embodiments of the apparatus according to the invention are also provided with functional units simultaneously tooling several, expediently three parallel band material tracks.

The starting material of the apparatus according to the invention is a rolled band steel of a temperable quality and of dimensions corresponding to the thickness and width of the spare part of the exemplary ampule file. One of the edges of the band is serrated during the feeding by the toothed, undriven roll which is brought into contact with the material only by a clamped friction coupling, then it is sharpened. A part of the thus prepared band material is heated up to a hardening temperature—in case of e.g. an apparatus simultaneously tooling three parallel band tracks—by direct resistor heating uniformly loading the three phases, then it is cut to parts according to the file dimension. Cutting and cooling required by hardening are carried out between clamped clamp plates in the combined cutting-cooling mechanism. The thus handled products become hardened throughout their full cross sections and preserve their shape determined by the clamped clamp plates, e.g. a straight, i.e. flat without camber or a curved shape. For the sake of saving in material and of proper performance, the part of the band which is fed and heated in a single cycle expediently corresponds not to the length of a single, but to the length of about 15 spare parts (files), facilitating the production of 45 products during one cycle, of approximately 8000 pieces of files per hour, when three parallel tracks are employed. The manufactured products will not change their original shape during the further finishing operations (mass galvanization).

The invention will now be further described, purely by way of example, with reference to the accompanying drawing, in which:

DETAILED DESCRIPTION OF THE PREFERRED EMBODIMENTS

Figure 1:
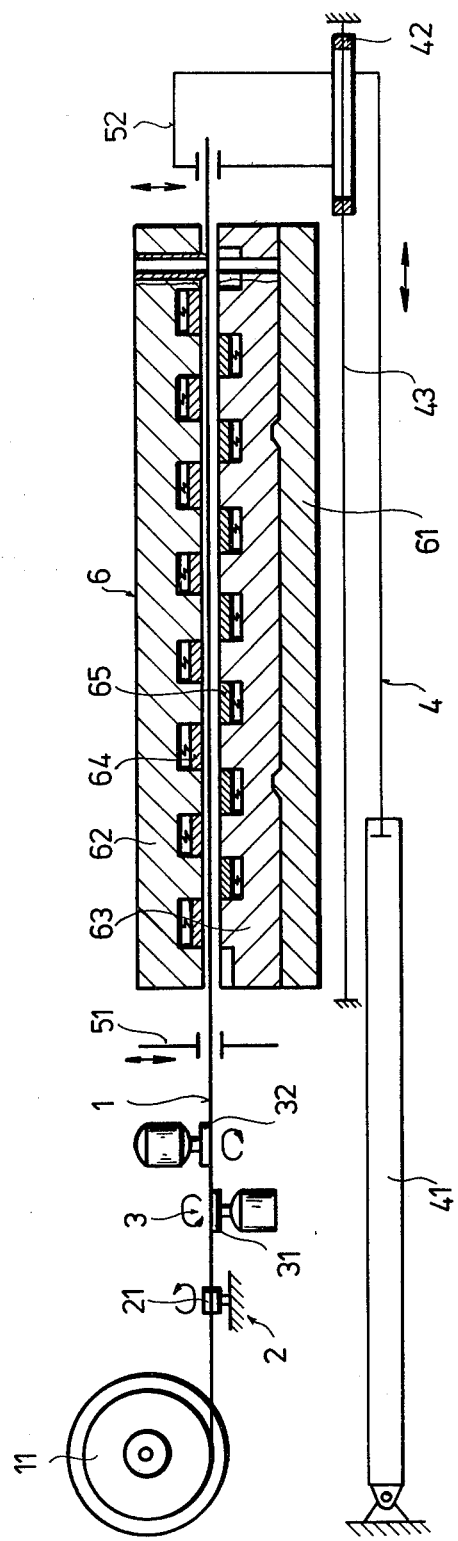
FIG. 1 is a partially broken, diagrammatic side view of the arrangement of the main structural units of an exemplary apparatus.
Figure 2:
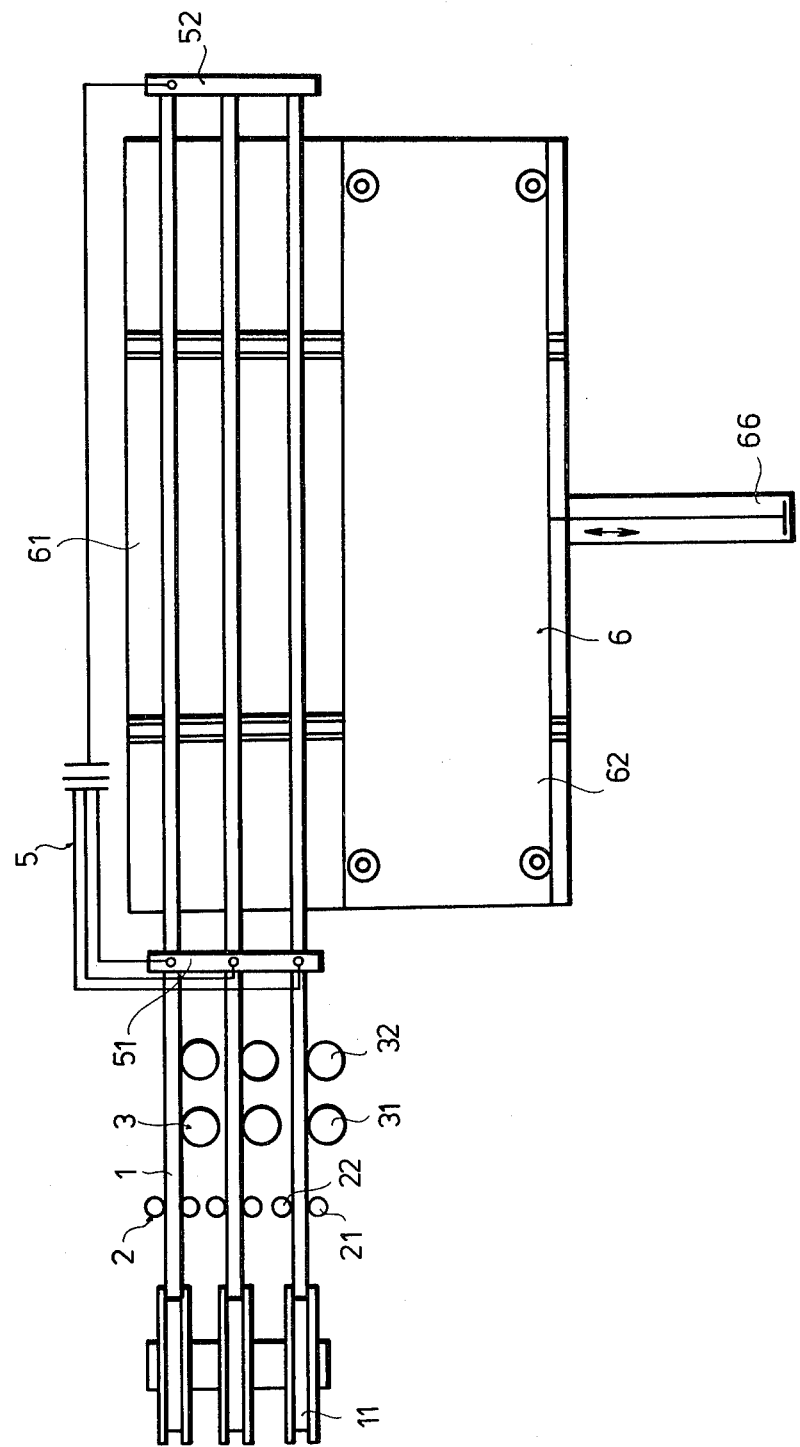
FIG. 2 is a diagrammatic top view of the apparatus according to FIG. 1.

In the exemplary embodiment of the apparatus according to the invention suitable for producing ampule files, intermittent feeding of the band material 1 stored on a spool 11 is accomplished by a feeding unit 4 driven by a pneumatic feeder cylinder 41, the slide 42 of which accomplishing linear and alternating displacement is guided by a guide 43 fixed in the space. Immediately adjacent to the spool 11, a serrating unit 2 comprising toothed rolls 21, 22 clamped to the side edges of the band material 1 is arranged, the rolls 21, 22 of which provide the side edges of the band material while it is fed with toothing, or rather with serration of a quality and depth required by the ampule files. It should be noted that in case of special ampule files it will suffice to serrate merely one side edge of the band material 1, accordingly, one of the rolls, 21 is serrated, while the other roll 22 plays the role of the support roll, supplemented with certain guiding functions in the given case. In a technological, and feeding sequence, respectively, the serrating unit 2 is followed by a sharpening unit 3 comprising driven abrasive discs 32, 32, where their plane of rotation is approximately parallel with the plane of the band material 1. One of the abrasive discs, 31 tools the lower, while the other abrasive disc 32 the upper surface of the band material 1, forming a serrated edge of adjustable dimension in the operational range of the file. In the band transfer direction comes the range of the effective heating-cutting-cooling mechanism according to the invention, encompassing under the plane of the band material 1 a cross slide 61 guiding and supporting the upper and lower clamp plates 62, 63 of the cutting-cooling mechanism 6, where said clamp plates comprise pairs of cutting tools 64, 65 and (only faintly illustrated) cooling water ducts. In the state of operation illustrated in FIG. 2 the cutting-cooling mechanism 6 is in the side end position, outside the track of the band materials 1, and the pneumatic working cylinder 66 displacing the mechanism is also shown in this figure. According to the technology employed in the apparatus according to the invention, prior to the operation of the cutting-cooling mechanism 6, the band material is heated up to the hardening temperature which is accomplished by the heating unit 5 comprising current feeding elements 51, 52 with direct resistance heating from a low-voltage supply unit. The apparatus is expediently formed for tooling simultaneously three parallel tracks of the band material 1, resulting in enhanced machine performance and increased productivity, respectively, and accordingly, heating of the individual band materials 1 can be accomplished with symmetric loading of the main supply, being supplied from one phase each. The solution of controlling the apparatus has expediently been developed such, that the band materials 1—while they are heated—are kept under a determined stretch by the feeding unit 4 (by clamping the end of the band and by maintaining at least a partial feeding, and a free stroke length, respectively), thus elongation caused by thermal expansion is also compensated, and the camber caused by it is prevented. Arriving at the hardening temperature, heating is stopped, and the clamp plates 62, 63 being opened and kept at a distance from one another of the cutting-cooling mechanism 6 are driven under and above, respectively, the heated band tracks 1 along the cross slide 62, then the clamp plates 62, 63 are closed together by a hyraulic or a pneumatic press cylinder (not shown in the figure), and the band materials 1 are cut to size in a heated state. According to the invention, the clamp plates 62, 63 are kept in a closed-together state until the ampule files are cooled perfectly down, thus their change in shape, their deformation is at a high certainty avoided, and prevented, respectively. The intensity of cooling (gradient of heat extraction) can be increased to an extent as required any time by a system of holes and ducts effected in the clamp plates, in which expediently adjustable amount of water is circulated.

Within the scope of the perception of the invention any other plate spare parts can naturally be produced from band materials, where the shape forming surface of the clamp plate can also be some spatial curve, e.g. arched or any more complex shape.

It can be conceived, that the scope of protection claimed is not restricted merely to the embodiment according to the exemplary referenced drawing, the apparatus according to the invention can be formed in numerous various variations and embodiments in respect of the sequence of the structural units, its effective constructional arrangement, its way of driving and control system, depending on the requirements of the deformation-free products to be produced any time.

We claim:

1. In an apparatus for producing planar shaped products from band material having at least one unit including a band hobbing and feeding unit, a heating and cooling unit and a cutting mechanism, the improvement comprising a cutting-cooling mechanism arranged on a cross slide and alternately displaceable crosswise to the transfer trace of the band material and wherein the cutting-cooling mechanism comprises pairs of cutting tools arranged in two at least approximately parallel clamp plates, means for pressing the clamp plates together and means for cooling the clamp plates.

2. An apparatus as claimed in claim 1 wherein the means for cooling the clamp plates comprises water cooled clamp plates having a system of holes and ducts.

3. An apparatus as claimed in claim 1 or 2 further comprising a directly resistance heated heating unit having current feeding elements clamping the band material in the ranges preceeding and following the cutting-cooling mechanism and a feeding mechanism maintaining the band material under prestretch during the heating.

4. An apparatus as claimed in claim 1, further comprising serrating means comprising at least one serrated roll clamped to the band material at one side.

5. An apparatus as claimed in claim 1, further comprising sharpening means having abrasive discs clamped to the band material at the top and at the bottom thereof, each disc and their plane of rotation being approximately parallel with the plane of the band material.

6. An apparatus as claimed in claim 1, further a plurality of units simultaneously tooling several, parallel tracks of band material.

* * * * *